United States Patent
Gower et al.

[11] Patent Number: 6,138,074
[45] Date of Patent: Oct. 24, 2000

[54] MONITORING STATION LOCATION DETERMINATION FOR A SATELLITE NAVIGATION SYSTEM

[75] Inventors: Arthur G. Gower, Germantown, Md.; Jack George Rudd, Boulder, Colo.; Henry M. Beisner, Rockville, Md.

[73] Assignee: Lockheed Martin Corporation, Bethesda, Md.

[21] Appl. No.: 09/220,689

[22] Filed: Dec. 23, 1998

[51] Int. Cl.[7] .......................... G01C 21/00; H04B 7/185; H04B 7/24
[52] U.S. Cl. .................... 701/215; 701/207; 701/213; 455/39; 455/500; 370/310; 370/312; 370/328; 342/357.01; 342/357.03; 342/357.06
[58] Field of Search .................... 701/215, 206, 701/207, 213, 214; 342/357.01, 357.03, 357.06, 450, 457, 463; 455/39, 40, 500; 370/310, 312, 328

[56] References Cited

U.S. PATENT DOCUMENTS

| | | | |
|---|---|---|---|
| 5,379,224 | 1/1995 | Brown et al. | 364/449 |
| 5,420,592 | 5/1995 | Johnson | 342/357 |
| 5,436,632 | 7/1995 | Sheynblat | 342/357 |
| 5,467,282 | 11/1995 | Dennis | 364/449 |
| 5,477,458 | 12/1995 | Loomis | 364/449 |
| 5,490,073 | 2/1996 | Kyrtsos | 364/449 |
| 5,495,257 | 2/1996 | Loomis | 342/357 |
| 5,515,057 | 5/1996 | Lennen et al. | 342/357 |

*Primary Examiner*—William A. Cuchlinski, Jr.
*Assistant Examiner*—Yonel Beaulieu
*Attorney, Agent, or Firm*—Venable; Richard L. Aitken

[57] ABSTRACT

In a global positioning system, satellites transmit navigation signals to users which determine their position from the received navigation signals. A wide area differential correction system employs receiving stations in fixed positions on the ground and compares ranges between the receiving stations and the satellites measured from the navigation signals with the actual ranges between the satellites and the receiving stations to determine correction information including corrections in the satellite clock times and the satellite positions to be transmitted to the users and from which the users can more accurately determine their positions. The site locations of the receiving stations to be used in the wide area differential correction system are determined by first determining an initial estimate of the site locations by means of a global positioning system and storing these initial estimates in a data base and then removing each receiving station from the wide area differential correction system in turn and calculating the wide area differential corrections without use of the site location of the removed receiving station. The site location of the removed station is then determined using the global positioning system and the wide area differential calculations and the site location of the removed station is updated in the data base with the site location thus determined. This process is repeated for each receiving station in turn three times to determine an accurate updated data base of site locations for the receiving stations to be used in the wide area differential correction system.

14 Claims, 2 Drawing Sheets ized with
MONITORING STATION LOCATION DETERMINATION FOR A SATELLITE NAVIGATION SYSTEM

FIELD OF THE INVENTION

The invention relates to satellite navigation systems and more particularly to a system for determining the location and calibration of a network of receiving stations for providing orbit, clock and atmospheric corrections for a satellite navigation system.

BACKGROUND OF THE INVENTION

Wide area differential correction systems (WAD) determine correction data to improve the accuracy, integrity, continuity and/or availability for satellite navigation systems. The most predominant of the satellite navigation systems is the Global Positioning System (GPS).

The GPS is owned and operated by the United States Air Force. It consists of nominally 24 satellites that are uniformly dispersed in orbits around the earth. There are six orbital planes, each containing four satellites. The orbits are 26,560 kilometers in height, have an inclination of 55° and are very nearly circular. The orbits are close to semi-synchronous with a period of 11.967 hours. The ground tracks of the orbits precess by 4 minutes per day.

Each satellite carries several atomic clocks to provide a stable time source for the navigation signal it transmits. The data for a navigation signal to be transmitted by each satellite is uplinked to such satellite typically once per day by the GPS Control Segment. The satellites retransmit the navigation data in a navigation signal using two spread spectrum L-band signals L1 and L2. L1 operates at a frequency of 1575.42 MHZ and is modulated by two binary phase shift key (BPSK) pseudo-random noise (PRN) codes; P (or Y) and C/A. L2 operates at a frequency of 1227.6 MHZ and is modulated by only the C/A code.

The Precision code (P-code) has a chipping rate of 10.23 MHZ. The full P-code has a length of 259 days before it repeats. Different satellites transmit different portions of the P-code, truncated to a length of 7 days. The P-code provides GPS user receivers with a precise indication of the time of transmission of the navigation signal within the week. The P-code can be replaced by the Y-code (used to prevent signal spoofing) at the discretion of the Air Force. The P and Y codes are intended for use by receivers authorized by the Department of Defense that contain appropriate keying material.

The second code is the Coarse/Aquisition code (C/A code). This code is available to all GPS receivers. The C/A code operates at a chipping rate ¹⁄₁₀th that of the P-code, 1.023 MHZ. The C/A code has a length of 1023 chips and repeats every millisecond. The C/A code is used for initial signal acquisition and to provide a navigation signal with lower fidelity than the P and Y codes.

Added to the P (or Y) and C/A codes is navigation data. The navigation data includes the ephemeris and clock information for the transmitting satellite, low accuracy almanac for all of the satellites in the constellation, ionospheric corrections, special messages, etc. This data is added at 50 bps and is different for each GPS satellite. More information on the GPS PRN codes and the GPS navigation message can be found in the GPS Interface Control Document *Navstar GPS Space Segment/Navigation User Interfaces*, ICD-GPS-200C, available from the U.S. Air Force.

GPS users obtain their time and position by receiving the signals from at least four GPS satellites. Each GPS satellite provides its location ($x_{sv_j}$, $y_{sv_j}$, $z_{sv_j}$) in the navigation message and the time that the message was transmitted from the satellite ($t_{sv_j}$) is discernable from the signal. From the location of the satellites and the propagation times between the satellites and the user, the user location ($x_u$, $y_u$, $z_u$) and the time $t_u$ can be determined. The propagation delays are measured by the user station generating PN code identical to the transmitted code, and approximately synchronized with the transmitted code and detecting the time difference between the locally generated PN code and the received PN code. There are four equations for the propagation time from each of the four satellites to the user. These four equations contain only four unknowns, the user coordinates, $x_u$, $y_u$, $z_u$, and the clock time $t_u$. Typically, the user will receive navigation signals from more than four satellites and will use a statistical computation to determine the closest fit of the user position and clock time to the received navigation data. The GPS user navigation solution is described in *Global Positioning System, Papers published in Navigation*, 1980, Institute of Navigation.

The accuracy of the GPS navigation signal is intentionally degraded by the Air Force by what is referred to as Selective Availability (SA). The effects of SA can be removed from the P and Y codes by authorized receivers with appropriate keying material. SA is intended to degrade the accuracy available to adversaries and terrorists.

Another available satellite navigation system is the Global Satellite Navigation System (GLONASS), operated by the Russian Space Forces. The GLONASS has 24 satellites in three orbital planes with a 64.8° inclination. The orbital height is 19,100 km with a period of 11 hours, 15 minutes. Where GPS operates by using different codes on the same frequency, GLONASS operates with a different frequency on each satellite. The principles of navigating with GLONASS are the same as those for navigating with GPS.

In the future, additional satellite-based navigation systems are expected to be deployed. This invention is applicable to any satellite navigation system. For convenience, the term GNSS will be used to denote GPS, GLONASS, and other satellite-based navigation systems.

LOCAL AREA DIFFERENTIAL SYSTEMS

To overcome the integrity concerns of GNSSs and provide accuracy improvements, a technique known as Local Area Differential (LAD) GNSS is used. LAD operates by placing a GNSS receiver at a precisely known location. This is known as the "base" receiver. In the usual method of implementation, that receiver determines its location using the GNSS and compares it to its true, known location. The difference between the GNSS solution and truth is then reported to the LAD GNSS users receiver. The user receiver then adjusts its solution in accordance with the difference reported by the base receiver.

In other methods of implementation, the base receiver determines the errors in each satellite's transmission and reports these to the user receiver. The user receiver can then correct each of the satellite signals it receives by the same amount. Several variations of a method for doing this are disclosed by Loomis in U.S. Pat. No. 5,495,257.

The principle drawback to a LAD system is that it has a limited range of applicability. Most LAD systems provide accurate corrections only within 100–200 kilometers of the base receiver.

DISTRIBUTED LOCAL AREA DIFFERENTIAL SYSTEMS

Distributed LAD systems have been created that place LAD base receivers 200 to 750 kilometers apart. The most notable of these systems is the U.S. Coast Guards Differential GPS Navigation System, which uses a series of LAD base receivers and position correction transmitters to cover most of the coastline of the United States.

Some systems have taken this one step farther. By interpolating the corrections between LAD base stations and transmitting the interpolated values to registered users, a much larger area can be covered with fewer base stations. This is the approach being taken by the OmniStar and SkyFix systems.

WIDE AREA DIFFERENTIAL SYSTEMS

To provide accuracy, integrity, continuity and availability improvements over a very large area, Wide Area Differential (WAD) GNSSs are used. Examples of WAD GNSSs are disclosed by Mueller et al. in U.S. Pat. No. 5,323,322. A WAD GNSS has a number of GNSS Receiving Stations (GRSs), also called monitoring stations, one or more Correction Processing Stations (CPSs), one or more WAD Communications Stations (WCSs), one or more means of communications to the users. Each of these will be addressed in turn.

The GNSS Receiving Stations receive the signals from the GNSS satellites and, typically, also from the WAD communications satellite(s). The signals may be preprocessed to correct for tropospheric and ionospheric delays. They are then forwarded to the CPS for processing.

The Correction Processing Station(s) is the collection point for all of the measurements taken by the GRSs. The CPS analyzes the measurements to determine some or all of the following about the GNSS and the WAD system.

Tropospheric delays at the CPS, GRS, and/or WCS.

A mapping or model of the ionospheric delay at different locations in the service region, GNSS satellite clock states of bias, drift and drift rate, GNSS satellite locations, velocities, and orbital elements, CPS, GRS, and WCS clock states, Details on several WAD methods for determination of the above parameters can be found in *Global Positioning System: Theory and Applications* by Parkinson and Spilker.

Other methods are disclosed by Mueller, et.al. in U.S. Pat. No. 5,323,322. These include a preprocessor and orbit and clock estimation algorithms.

The WAD Communications Station(s) can transfer the WAD corrections and integrity information to users by satellite or by other electronic means like radio signals or pseudolites (a pseudolite is a transmitter that operates like a stationary satellite, located on or near the ground). The signals containing the WAD corrections and integrity information can also provide a ranging source to the users, i.e., the WCS can generate a signal that is equivalent to that generated by an appropriate GNSS satellite. The location, equivalent to the satellite location, of this navigation signal transmission is the transmission source, radio tower, or pseudolite site. The LAD GNSS systems and the WAD GNSS systems differ only in their approaches to calculating differential corrections and how they are applied by the user. These two systems are referred to generically herein as differential correcting GNSS systems.

All differential correction GNSS systems require knowledge of the precise locations (to within centimeters) of their CPS, GRS, and WCS. The industry standard method for locating these assets is to perform a precise survey on the ground with a surveying team. The surveying methods utilize measurements from a known location to determine the offset of the point being surveyed to the known location. The location of the point being surveyed can then be determined.

Professional surveys can be expensive, especially in difficult or remote terrain. The survey team must be transported to the point being surveyed. There can also be difficulties associated with the proximity of the known location. This can often lead to a high cost for the surveys. The present invention provides a much less expensive means of surveying ground assets.

In some places, a known location to base the survey on is not available. The surveys are then based on satellite navigation techniques using one or more of GPS, GLONASS, local area differential, or wide area differential. The present invention provides accuracies that are better than those provided by GPS or GLONASS. The present invention provides accuracies as good as wide area differential systems. Accuracy comparison with local area differential systems is dependent on the distance the survey point is from the local area reference station.

In some situations it is not desirable to have a survey team go to the survey location. This might occur with sites located in a military conflict area or at sites located within hazardous regions such as a fault line or volcanic vent. In these cases the signal receiving stations can be flown, airdropped, or driven to the desired location. The invention provides precise survey of these station locations without subjecting a survey team to the dangers present at the site.

The invention also provides a differential correction system with the capability to periodically resurvey and verify the locations of its Correction Processing Station(s), WAD Communications Station(s), and/or GNSS Receiving Stations. The verification can be done while the system is operational without affecting the service provided to the differential correction system GNSS users.

The invention is particularly useful in determining the site locations of transportable, monitoring stations, which are employed as receiving stations in the differential correction GNSS system. The transportable monitoring stations can be moved to a new location and the new location of the monitoring stations can be readily determined for use in the differential correction system. The preferred embodiment of the invention is employed in and makes use of a WAD GNSS system. The invention is also applicable to LAD GNSS systems.

SUMMARY OF THE INVENTION

The invention meets the above described needs by providing remote survey capabilities for any station that receives GNSS satellite signals as part of a differential correction GNSS Service Provider Network (e.g., the ground facilities of the FAA Wide Area Augmentation System). The invention also provides the capability to survey in all of the WCSs, GRSs, and CPSs that make up a WAD Service Provider Network without prior surveys.

GNSS receivers at the receiving stations track the GNSS satellites and provide measurements indicating the apparent distance between the satellites and the receivers. The CPS then carries out the WAD process to arrive at a set of corrections for the GNSS satellite clocks and locations, and the ionospheric delays over the service area of the system.

In accordance with the invention, an initial estimate of the site location of each receiving station to be surveyed by the system is made. This initial estimate is made by the conventional GPS location calculation process.

The CPS then excludes one of the receiving stations to be surveyed from the calculations of WAD corrections and the WAD corrections are calculated using all the remaining receiving stations over an extended time period. In these calculations of the WAD corrections, the initial estimates of the site locations of the remaining receiving stations are assumed to be correct and are used in the calculation of the WAD corrections. The site location of the receiving station being surveyed is then determined as if it were a GNSS system user using the WAD differential corrections determined in the previous step. The site location of the receiving station determined in this manner replaces the initial estimate of this site location and the receiving station is entered back in the WAD system with the updated site location. The process is then repeated for each receiving station in turn until all of the receiving stations to be surveyed have been surveyed and have their initial site location estimates updated with more accurate site locations determined by the WAD GNSS system. The process is repeated at least one more time for each receiving station and preferably a third time. At the end of the second cycle through the receiving stations, the site location will be determined with an accuracy of 0.2 meters. The third cycle validates the site locations that have been determined.

In addition to surveying site locations of receiving stations which are unknown, the process can also be used to validate existing survey results. In this case, the process can be performed simultaneously with normal operation of the system (e.g., in a separate processor).

DESCRIPTION OF THE PREFERRED EMBODIMENTS

Figure 1:
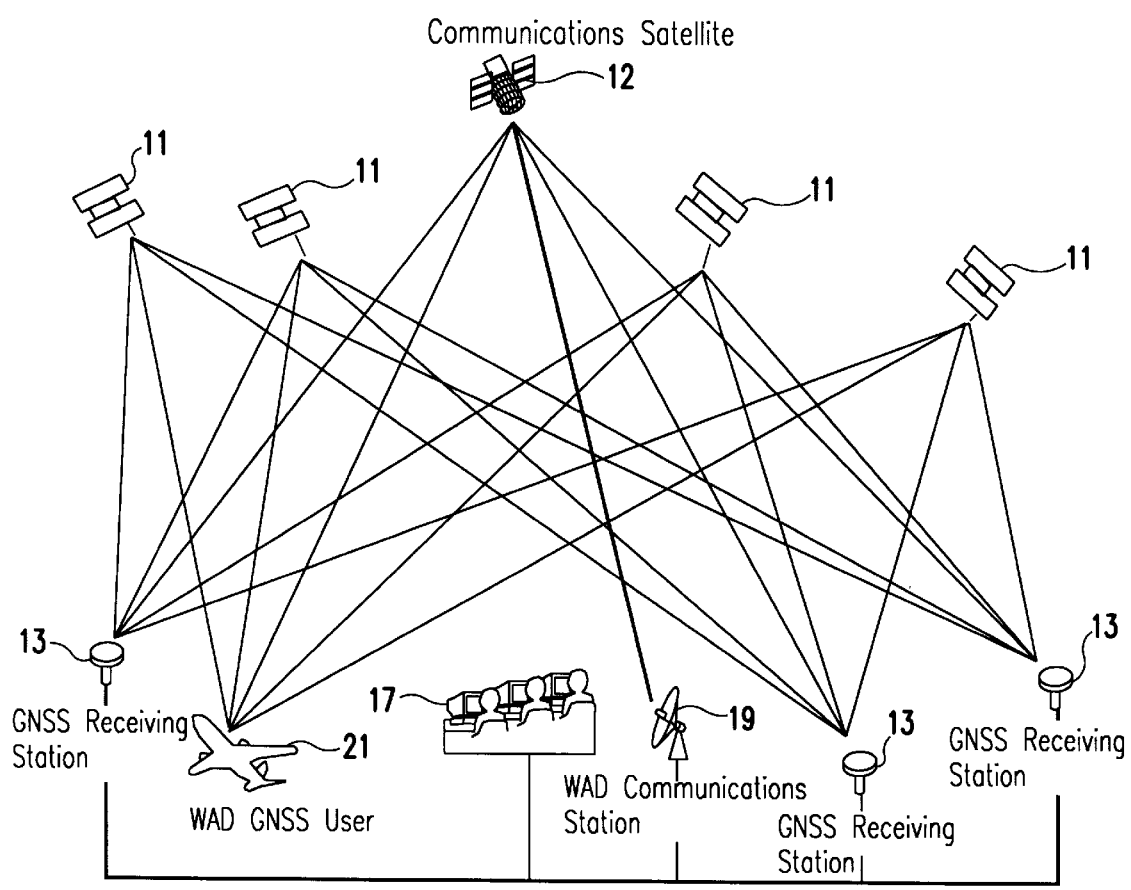
FIG. 1 schematically illustrates the system in which the invention is used.

The present invention, as shown in the drawings, comprises at least four satellites 11 and typically will use all of the satellites in the global positioning system in view of the receiving stations. Each satellite 11 transmits navigation signals containing an indication of the satellite position and the time of transmission from such satellite. A communications satellite 12 will also transmit a correction message which includes WAD corrections for the satellite clock bias and corrections for the satellite positions. The correction message also may include information to correct for satellite troposphere and ionosphere distortion. The WAD corrections transmitted by the communications satellite are computed by a data processor which operates as the Correction Processing Station (CPS) of the WAD GNSS system. The CPS uplinks the WAD corrections to the communication satellite 12 via WAD communication station 17. The navigation signal and the WAD corrections are received by users and are used by the user to determine their positions. In FIG. 1, aircraft 21 represents a user receiving the navigation signals from satellites 11 and WAD corrections from communications satellite 12. The navigation signal transmitted by each satellite includes pseudo random (PN) code sequences which are synchronized with the satellite clock, and which are different for each satellite. The user determines the user positions and the time by generating the PN codes approximately synchronized with the satellite codes. The user measures the time offset between the received PN codes and the corresponding locally generated codes. These time offset measurements are related to the satellite ranges. The coordinates of the position of the user $x_u$, $y_u$, and $z_u$ and the clock time $t_u$ are related to the time offset measurements and the satellite positions in well known equations. In these equations, the coordinates of the user $x_u$, $y_u$, and $z_u$, and the time $t_u$, are unknowns and the satellite positions, and the time offset measurements are known values. With measurements from at least four satellites, the user can determine the time and his position from the four equations for the four measurements. The user in the WAD GNSS uses the WAD corrections to correct the satellite position and to correct for satellite clock biases as described in U.S. Pat. No. 5,323,322. Alternatively, the WAD system may be that disclosed in copending application Ser. No. 09/220,680, entitled *Global Positioning System Employing Clocks Only Model*, invented by Henry M. Beisner, Jack George Rudd and Robert Harold Benner, filed Dec. 23, 1998, which is hereby incorporated by reference. The user may also make use of ionosphere and troposphere distortion correction information and integrity information provided in the WAD corrections in making the calculations of the user position.

A plurality of GNSS receiving stations 13 on the ground are provided. In the specific embodiment, one or more of these receiving stations are transportable monitoring stations. The receiving stations 13 are all provided with a capability to transmit digital data to a central processing facility 17, which comprises a WAD corrections procession station. This transmission capability may be by cable or by radio link. Each of the receiving stations 13 are designed to receive and interpret the navigation signals transmitted by the satellites 11 and have the capability of determining their positions and the time in the same manner as a user. Thus, each receiving station 13 generates PN codes in approximate synchronism with the satellite codes and detects the time offset between the locally generated PN codes and the PN codes received from the satellites to determine site location and time. In the specific embodiment of the invention shown in FIG. 1, the site locations of the receiving stations 13 are assumed not to be known initially and the function of the invention is to perform a survey to determine the site locations of the receiving stations 13. When the site locations of the receiving stations 13 have been determined with precision, the receiving stations 13 will compute the ranges between the receiving stations and the satellites 11 and transmit these ranges to the CPS 17, which will compare the measured satellite ranges with known satellite ranges to compute the WAD corrections, such as in the manner taught in U.S. Pat. No. 5,323,322.

Figure 2:
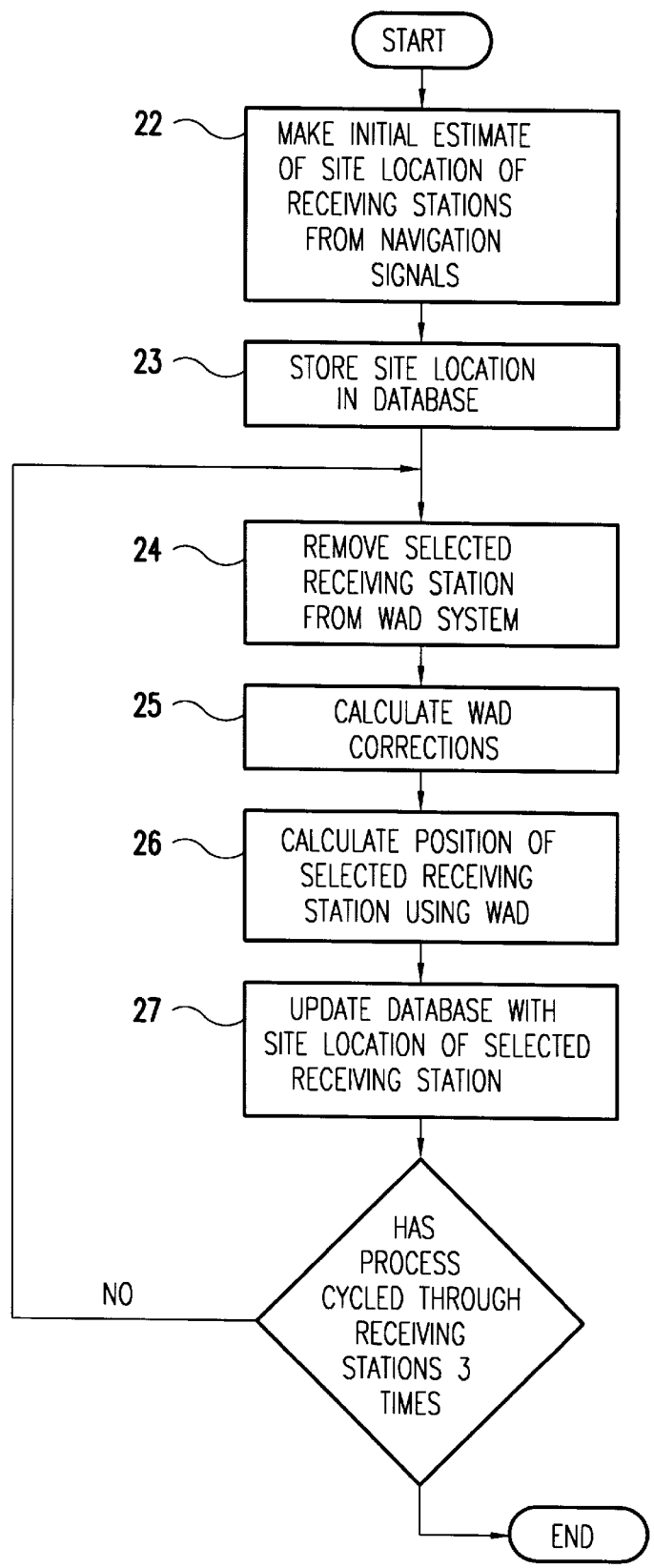
FIG. 2 illustrates a flow chart of the method of surveying a set of receiving stations in accordance with the invention.

As shown in the flow chart of FIG. 2, the site surveying process of the invention, in a first step 22, makes an initial estimate of the site location of each receiving station 13. These initial estimates are determined by conventional global position system location calculations from the navigation signals received by the receiving stations 13. Since the site locations of the receiving stations 13 will not be known at this time, no WAD corrections based on the site locations of the receiving stations 13 are provided to the receiving stations and the initial estimates are made without the WAD corrections. These initial estimates of the receiving station site locations are stored in a receiving station site location database at the CPS 17 in step 23. After the initial estimates of the site locations of the receiving stations have been stored in the receiving station site location database, a first one of the receiving stations 13 is selected and is removed from the WAD GPS correction system in step 24. Then, the WAD corrections are calculated in step 25 with the selected receiving station removed from the WAD system. The WAD system thus calculates the WAD corrections to go into the error message without the site location data from the removed receiving station. These WAD calculations are carried out for a sufficient period of time to allow the corrections determined by the WAD system to settle to stable values, for example, for a period of 30 minutes. In this calculation, the initial estimates of the site locations of the receiving stations remaining in the WAD system are assumed to be accurate and are used to determine satellite ranges to be compared with measured satellite ranges in order to determine the WAD corrections. Following this step of calculating the WAD corrections, the surveying process in step 26 calculates the position of the removed receiving station as if it were a WAD GPS user wherein the navigation signals received by the receiving station being surveyed and the WAD corrections are used in determining receiving station site location. This new site location calculated for the receiving station is then used to update the receiving station site location in the receiving station location database in step 27. In step 28, the site location surveying process then determines whether or not the process has cycled through all of the receiving stations at least three times. If not, the process returns to step 24 and the next receiving station 13 in a preset sequence of the receiving stations 13 is removed from the WAD system. The process is then repeated for this next receiving station in steps 24–27 to obtain a new site location for the next receiving station in the sequence and to update the site location database accordingly. The process is repeated for all the receiving stations so that a new site location has been updated in the database for each receiving station. After each receiving station is removed from the WAD system, the WAD corrections are computed over a period of thirty minutes to allow the computed corrections to settle to stable valves. The process is then repeated a second time for each of the stations using the updated receiving station site locations in the database. At this point in the surveying process, only minor modifications in the database locations on the order of 0.2 meters should be needed for each receiving station. To validate the process, the process is repeated one more time for each of the receiving stations whereupon the decision step 28 will determine that the third cycle though steps 22–27 has been completed and the process terminates.

With the method as described above, the system of the present invention accurately surveys the site location of each receiving station to within 0.1 meters.

In the specific embodiment described above, site locations of all the receiving stations are unknown. The system is also applicable to systems in which the site locations of some receiving stations have been surveyed with traditional surveying methods and are precisely known. For example, the CPS and the WAD communications station 19 may each include a receiving station with a known site location. Typically, in such a system, the receiving stations with known site locations would not be surveyed by the system, and the measurements from these stations would be included in WAD correction calculations from the beginning of the process. Alternatively, the receiving stations having known site locations determined by traditional surveying methods, may have their site locations surveyed by the system of the invention to validate their site location surveys. Alternatively, the system can be used to validate the site location surveys of the receiving stations in a system in which the site location of all of the receiving stations have been previously determined.

In the specific embodiment, one or more of the receiving stations is transportable. The system is particularly useful in WAD systems employing transportable surveying stations, since the site location of a transportable receiving station needs to be resurveyed each time the receiving station is moved.

In the specific described embodiment, the WAD corrections are uplinked to the communications satellite to be transmitted to the user and the receiving stations. The WAD corrections can be transmitted to the user and to the receiving stations by other communications channels such as via the satellites 11. Alternatively, the communications to the receiving stations can be by direct radio link or by a cable connection.

The specific embodiment of the invention is described as being incorporated in a WAD system. The system is also applicable to other differential correction GNSS systems having more than one receiving station, such as distributed LAD systems.

These and other modifications may be made to the above described specific embodiment of the invention, without departing from the spirit and scope of the invention, which is defined in the appended claims.

What is claimed is:

1. In a global positioning system including satellites which transmit navigation signals from which a user can determine his position and including a differential correction system in which the range between at least three receiving stations in fixed positions and said satellites are measured from said navigation signals and are compared to the actual ranges between said satellites and said receiving stations to compute differential correction information including corrections to satellite clock times and corrections to the satellite positions; a method of determining the positions of said receiving stations comprising establishing a database of receiving station site positions for use in said differential correction system, removing a first one said receiving stations from said differential correction system and calculating said differential correction information from the site positions in said database over a selected time interval while the site position of said first receiving station is removed from the calculations of said differential correction information, determining the position of said first one of said receiving stations from said navigation signals and said differential correction information and updating the site position of said first one of said receiving stations in said database with the site position of said first one of said receiving stations determined from said navigation signals and said differential correction information, then removing a second one of said receiving stations from said differential correction system and calculating said differential correction information over a selected time interval from site positions in said database including the updated site position of said first one of said receiving stations while the site position of said second one of said receiving stations is removed from the calculations of said differential correction information, determining the site position of said second one of said receiving stations from said navigation signals and said differential correction information and updating the site position of said second one of said receiving stations in said database with the site position of said second one of said receiving stations determined from said navigation signals and said differential correction information, removing a third one of said receiving stations from said differential correction system and calculating said differential correction information over a selected time interval from site positions in said data base including the updated site position of said first one of said receiving stations and the updated site position of said second one of said receiving stations while the site position of said third one of said receiving stations is removed from the calculations of said differential correction information, determining the site position of said third one of said receiving stations from said navigational signals and said differential correction information and updating the site position of said third one of said receiving stations in said data base with the site position of said third one of said receiving stations determined from said navigation signals and said differential correction information.

2. A method as recited in claim 1, wherein said data base of receiving stations site positions is initially determined from said navigation signals.

3. A method as recited in claim 1, wherein said site positions of said receiving stations are initially unknown and said database of site positions is initially determined from the navigation signals without use of differential corrections computed by said differential correction system.

4. A method as recited in claim 1, wherein the site positions of a plurality of said receiving stations are unknown and one or more of said plurality of receiving stations is a transportable receiving station.

5. A method as recited in claim 1, further comprising calculating said differential corrections from said data base of receiving stations site positions after all of their receiving site positions of receiving stations which were unknown have been updated and transmitting the differential correction information computed from the updated database to a user receiving navigation signals from said satellites, said last named user using said navigation signals and the transmitted differential correction information to determine said last named user's position.

6. A method as recited in claim 1, wherein said differential correction system is a wide area differential correction system.

7. A method as recited in claim 6, wherein the differential correction information calculated by said wide area differential correction system is included in a correction message transmitted to user and wherein said correction message includes information for troposphere and ionosphere distortion correction.

8. In a global positioning system including satellites which transmit navigation signals from which a user can determine his position and including a differential correction system in which the range between the receiving stations in fixed positions and said satellites are measured from said navigation signals and are compared to the actual ranges between said satellites and said receiving stations to compute the differential correction information including corrections to satellite clock times and corrections to satellite positions; a method of determining the positions of said receiving stations comprising establishing a database of receiving stations site positions for use in said differential correction system and then updating the site position of each receiving station in said database in turn in accordance with the following steps:

1) removing the selected receiving station from said differential correction system and calculating said differential correction information from the site positions as currently updated in said data base over a selected time interval while the site position of the selected receiving station is removed from the calculations of said differential correction information, 2) determining the position of the selected receiving station from said navigation signals and said differential correction information, 3) replacing the site position of the selected receiving station in said data base with the site position determined in step 2, and 4) repeating steps 1–3 on each receiving station a second time.

9. In a method as recited in claim 8, further comprising calculating said differential correction information from the updated data base after performing said steps 1–3 on each of said receiving stations at least twice and transmitting the differential correction information to a user wherein said last named user uses said navigation signals and said differential correction information to determine the user's position.

10. A method as recited in claim 8, wherein said database of receiving station site positions is initially determined from said navigation signals.

11. A method as recited in claim 8, wherein the site positions of said receiving stations are initially unknown and wherein the site positions in said database is initially determined from said navigation signals without use of differential corrections computed by said differential correction system.

12. A method as recited in claim 8, wherein the site positions of a plurality of said receiving stations are unknown and one or more of said plurality is a transportable receiving station.

13. A method as recited in claim 8, wherein said differential correction system is a wide area differential correction system.

14. A method as recited in claim 13, wherein the correction calculated by said wide area differential correction system is included in a correction message transmitted to user and wherein said correction message includes information for troposphere and ionosphere distortion correction.

* * * * *